United States Patent [19]

McCrum

[11] 4,159,699
[45] Jul. 3, 1979

[54] COMPOUND ENGINES

[76] Inventor: William H. McCrum, Candlewood Mountain Rd., New Milford, Conn. 06776

[21] Appl. No.: 846,579

[22] Filed: Oct. 28, 1977

Related U.S. Application Data

[62] Division of Ser. No. 734,638, Oct. 18, 1976, Pat. No. 4,086,882.

[51] Int. Cl.² .............................................. F02B 75/20
[52] U.S. Cl. ................................ 123/59 EC; 60/619; 60/620; 123/1 R
[58] Field of Search .................... 123/1 R, 37, 59 EC, 123/59 BM, 53 A, 64; 60/620, 619, 622, 623

[56] References Cited

U.S. PATENT DOCUMENTS

| B 282,390 | 1/1975 | Siewert | 123/59 EC |
|---|---|---|---|
| 2,196,228 | 4/1940 | Prescott | 123/53 A |
| 3,789,807 | 2/1974 | Pinkerton | 123/59 EC |
| 3,991,721 | 11/1976 | Hurd | 123/59 EC |
| 4,075,980 | 2/1978 | Anger | 123/1 R |

FOREIGN PATENT DOCUMENTS 466528 11/1951 Italy ............................................. 60/622

Primary Examiner—Charles J. Myhre
Assistant Examiner—Craig R. Feinberg
Attorney, Agent, or Firm—E. Seward Stevens

[57] ABSTRACT

This invention relates to improving the internal combustion and internal use of fuel in reciprocating engines, and more particularly to reciprocating engines which are compounded in order to effect extension of the expansion event of the four-event work cycle of such engines and which are enabled especially thereby to receive and use, for the furtherance and prolongation of the combustion process, secondary air inducted by such engines or made available by external means, said air being directly applied to the engine's working medium after the original ignition of each fuel/air charge or any equivalent thereof, and during the power-producing period in which that working medium expands.

2 Claims, 9 Drawing Figures

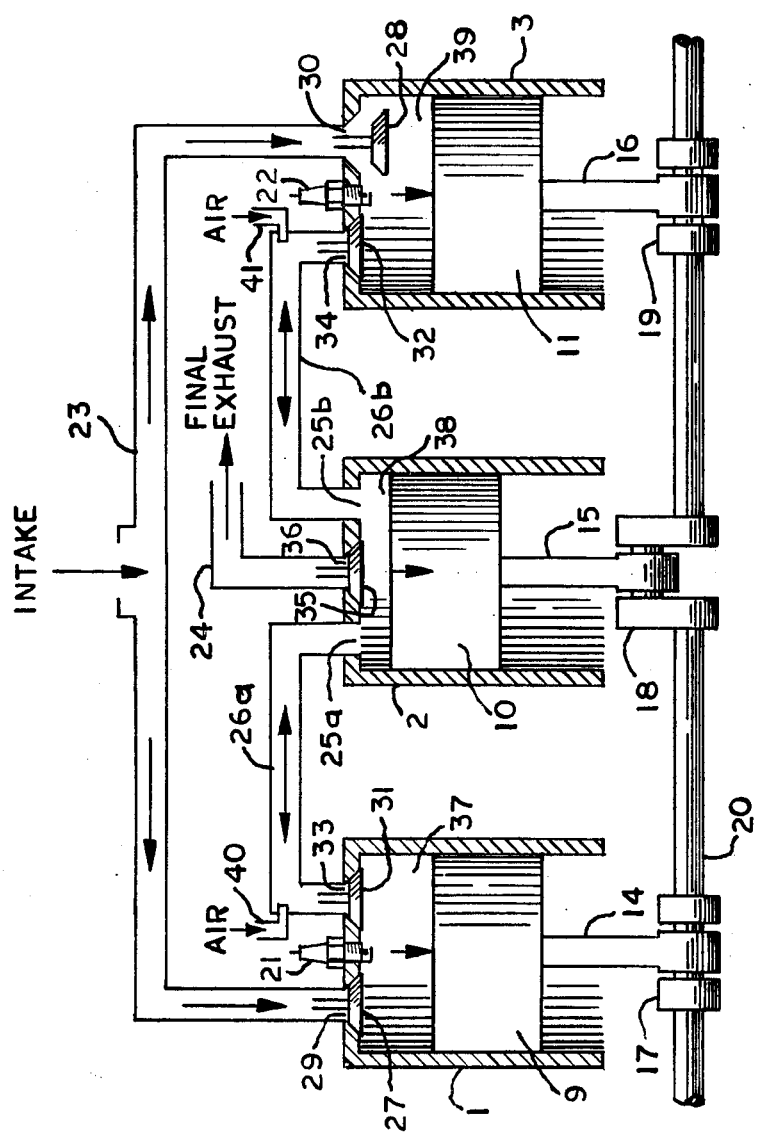

COMPOUND ENGINES

Applicant is the owner and inventor of divisional application, Ser. 734,638 filed 10/18/76 now U.S. Pat. No. 4,086,882 for compound engines.

The objects of compounding such engines using said secondary air are: to reduce fuel consumption by more effective utilization of heat within the engine which results in a gain in power from the combustion of a given amount of fuel; and to effect more complete combustion of the fuel within the engine so as to reduce effectively the quantity of harmful pollutants normally exhausted.

To satisfy the said objectives, I reasoned that engines require the combination of more time, space and air properly applied to the combustion-expansion process.

Therefore, although compound steam engines are not involved with internal combustion of fuel, certain principles of such prior art are employed in a different manner as means to effect extension of the expansion event of my internal combustion engine's work cycle, thereby providing for such engine the said extra time and space for the combustion-expansion process.

Furthermore, as the extension of said expansion event involves the transfer of the engine's working medium from one cylinder to another, I conceived means for adding secondary air to that working medium to support the combustion of any unburned combustibles therein.

Included in other prior art known to me are five inventions which pertain to internal combustion reciprocating engines somewhat related to the engines of the present invention, but which differ therefrom in operation and/or structure to a considerable degree.

Only the engines of the two earliest of said five inventions can be said to have operated actually as compound engines. In those engines, invented prior to 1916, such portion of engine working medium which was created from the explosion of a single fuel-air charge was shared and used by two coacting cylinders, so as to allow that medium to expand continuously against the respective pistons of said cylinders which then were undergoing their power-producing expansion events.

However, in those engines the expansion events of the coacting cylinders were limitedly overlapped. The period of such overlap commenced when the crankshaft crank serving either primary cylinder was at a maximum angle of only 60° before its bottom-center position which ended a primary-cylinder expansion event in accordance with the stated arrangement of the crankshaft cranks.

Differently, the proposed compound engines provide a much earlier overlap, thereby effecting a much longer period of the overlap of expansion events. This increases engine torque and improves the engine's power output from a given amount of fuel.

Moreover, the compound engines of the present invention utilize secondary air to improve and maximize the internal combustion of the fuel; whereas those earlier compound engines used only the carbureted air inducted and compressed prior to ignition thereof. No secondary air was used by those engines.

The engines of the other three inventions are of the two-stage-combustion type, rather than the compound engine type.

In such engine, the working medium ceases working when it is transferred merely as exhaust from one cylinder to another which then is not acting in its power-producing expansion event. That exhaust is treated by secondary air either enroute or in the receiving cylinder. The resultant mixture is next compressed suitably to be either spark-ignited or compression-ignited, the explosion of that mixture then creating another and different quantity of working medium in that secondary cylinder.

The latter-described method of engine operation is obviously different from that used in the proposed compound engines which provide additional advantages subsequently described.

While this invention pertains to a number of engines of different type, size or design, I have selected three engine arrangements in order to illustrate the process involved and its application to certain engines of varied design.

These engines are: a six-cylinder in-line reciprocating engine; a 90° V-8 cylinder reciprocating engine; and a modified arrangement of that V-8 engine. Although these engines are considered as utilizing a spark-ignition system to initiate primary combustion of the fuel, the said process also applies to engines using the compression-ignition system for that same purpose.

Referring to the accompanying drawings

Figure 1:
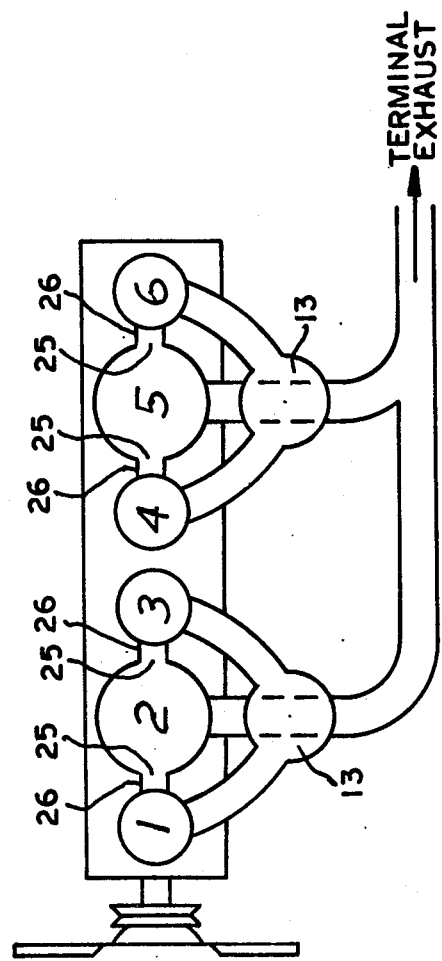
FIG. 1 is a schematic representation of a 6 cylinder compound engine.
Figure 3B:
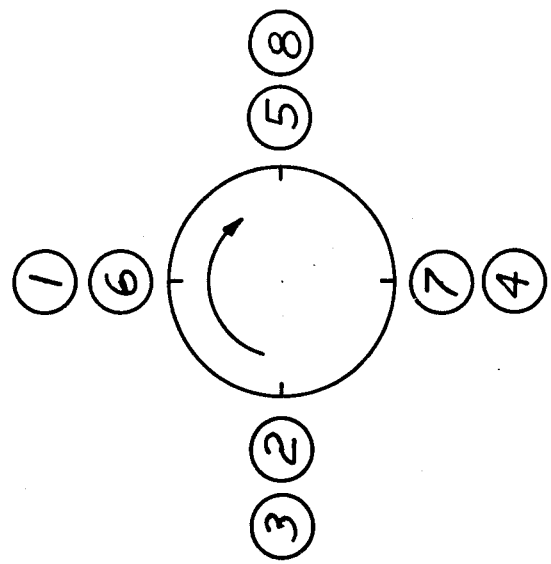
Figure 3A:
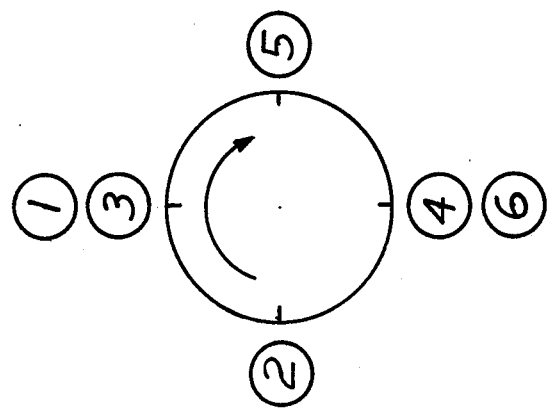

FIG. 3a indicates crankshaft crank positions of the 6 cylinder compound engine shown in FIG. 1.

FIG. 3b indicates said crank positions for a V-8 cylinder compound engine.

Figure 4:
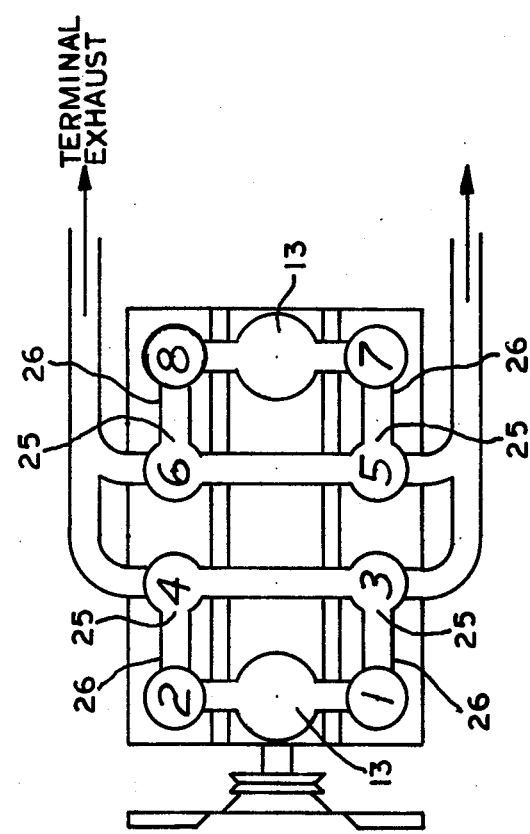

FIG. 4 is a schematic representation of a V-8 engine using two secondary cylinders in each compounded section of the engine, one carburetor serving each section.

Figure 5:
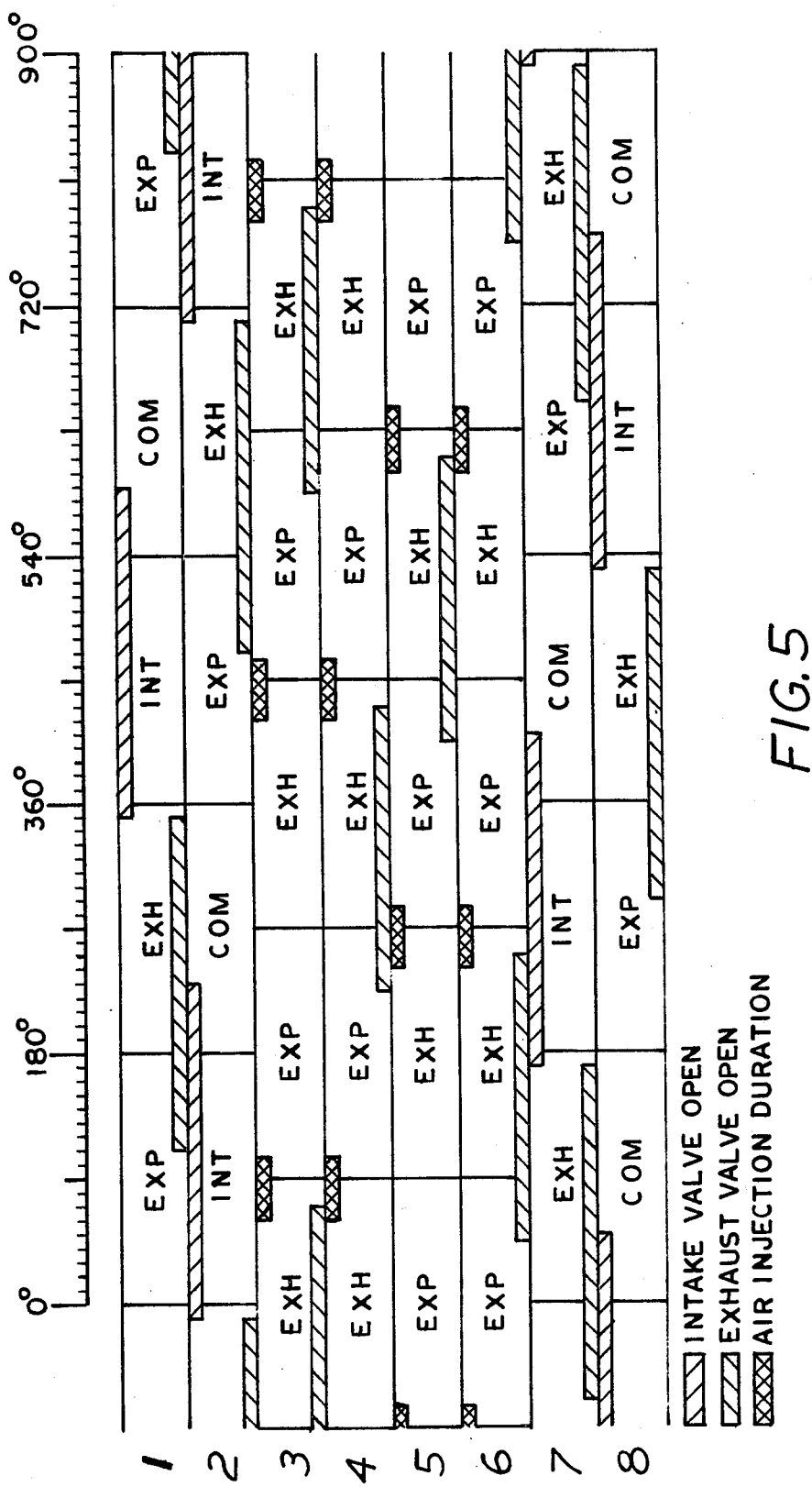

FIG. 5 is a schematic diagram indicating sequence of events of the V-8 engine work cycle of the engine shown in FIG. 4 and duration of valve open time for each individual cylinder.

Figure 6:
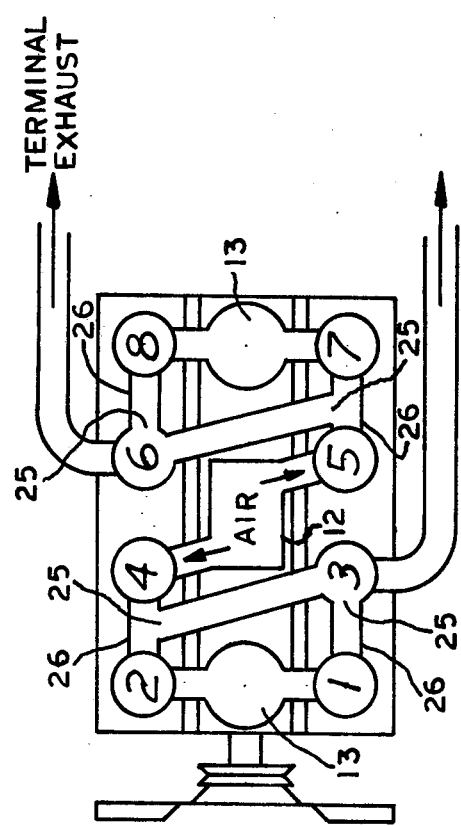

FIG. 6 is a schematic representation of a modification of the V-8 engine shown in FIG. 4, said modification including use of an air-inducting cylinder as one of the secondary cylinders in each of the two compounded engine sections.

Figure 7:
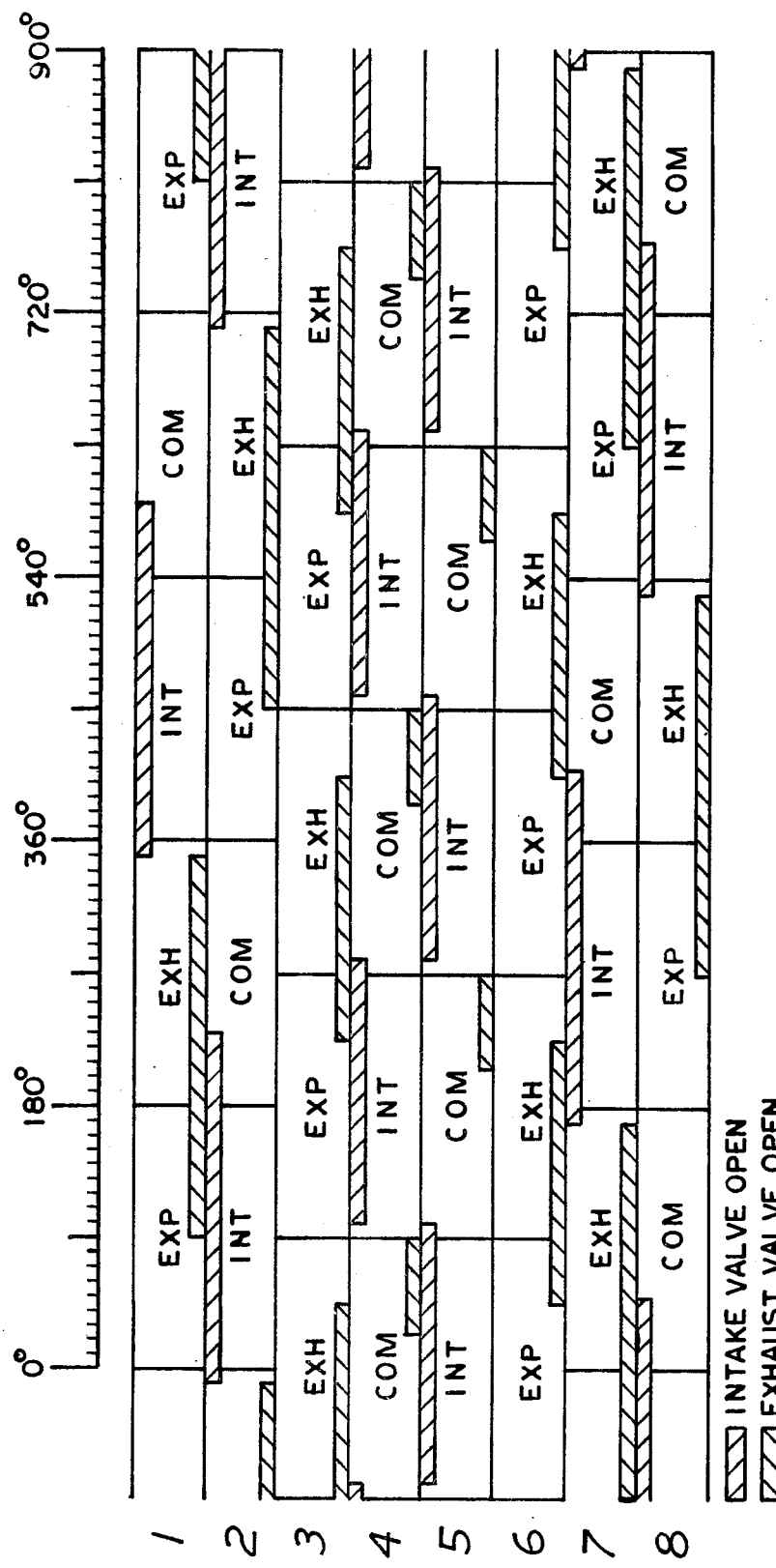

FIG. 7 is a schematic diagram indicating the sequence of events of the V-8 engine work cycle of the engine shown in FIG. 6 and duration of valve open time for each individual cylinder.

Figure 8:
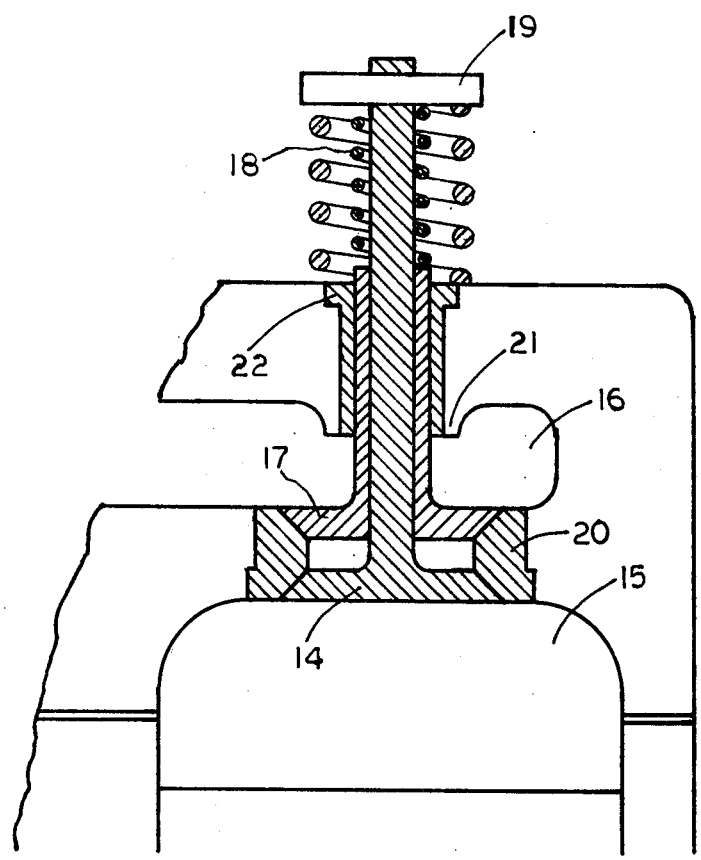

FIG. 8 represents schematically and partly in section, a combination valve and check valve used in these compound reciprocating engines to prevent untimely unseating of exhaust valves during sharing and transfer of working medium between interconnected cylinders.

FIG. 9 diagrammatically exemplifies a basic engine section of the invention.

This six-cylinder engine comprises four primary cylinders which distinguish from secondary cylinders by operating according to the work cycle of four events known respectively as intake, compression, expansion and exhaust, and by being provided with usual means by which ignition of each fuel/air charge is initiated therein. Schematic FIG. 1 shows these four primary cylinders by legend numbers 1, 3, 4 and 6.

Each of the secondary cylinders, numbered 2 and 5 on FIG. 1, is provided with two in-cylinder-head valveless (constantly open) ports 25 of in-head conduits 26 respectively leading to the exhaust side of the exhaust valve in the respective primary cylinder. Each conduit serves as a passageway for gases moving between coacting cylinders. These secondary cylinders operate without an ignition system and complete their work cycle in 360 degrees of crankshaft rotation involving only two events which are named respectively herein as expansion and exhaust.

It is significant to note at this point that this engine actually comprises two distinct working sections, one engine section involving cylinders 1, 2 and 3, and the other section involving cylinders 4, 5 and 6; and to note also that ignition of each fuel/air charge in primary cylinders occurs alternately between said two sections.

"One such basic engine section is diagrammatically represented by FIG. 9 wherein the three illustrated cylinders 1, 2, 3 may be considered as corresponding to the same-numbered cylinders of FIG. 1.

Per FIG. 9 said cylinders respectively contain reciprocable pistons 9, 10, 11 movably connected respectively in conventional manner to connecting rods 14, 15, 16 in turn rotatably attached to cranks 17, 18, 19 of a crankshaft 20.

Cylinders 1, 3 serve as primary cylinders operating conventionally as prime movers according to the known four-stroke cycle, and having, respectively, intake valves 27, 28; intake ports 29, 30; exhaust valves 31, 32; and exhaust ports 33, 34. Cylinders 1, 3 have spark plugs 21, 22 indicating use of a spark-ignition system in this particular engine arrangement.

The middle cylinder 2 operates according to a work cycle of only two events completed in one revolution of crankshaft 20. In this example, those events are expansion and exhaust.

Cylinder 2 requires no spark plug or ignition system, as such, and is equipped with an exhaust valve 35 governing exhaust port 36 through which terminal or final exhaust is ejected from the engine to the atmosphere via exhaust manifold 24.

For clarity of presentation, two conduits 26a, 26b are separately picturized connecting exhaust ports 33 and 34 respectively to two valveless (constantly-open) ports 25a, 25b in cylinder 2, which structure is preferred. However, their subsequently-described purpose may be filled suitably by one port 25 connected to one conduit 26 connecting both said ports 33, 34. Conduit 26 structure will be described hereinafter.

FIG. 9 illustrates cylinder 3 undergoing its intake event with piston 11 at the midpoint of its downstroke as shown by the position of crank 19 at 90° ATC (90° BBC). Intake valve 28 is open enabling piston 11 to induct or draw into cylinder 3 a fresh fuel/air charge through intake manifold 23 conventionally connected to a carburetor and fuel supply (not shown). Accordingly, exhaust valve 32 is closed.

Crank 17 is likewise positioned at 90° BBC indicating that piston 9 is at the midpoint of its downstroke during the expansion event occurring in cylinder 1.

The previously inducted and compressed fuel/air charge, ignited by spark plug 21, effected by its explosion the power-producing working medium in combustion chamber 37 to drive piston 9 in its power stroke. Intake valve 27 and exhaust valve 31 are seen closed, valve 31 due to be opened 20° later whe crank 17 reaches 70° BBC in its rotation.

Per FIG. 9, piston 10, connecting rod 15 and crank 18 are at Top Dead Center (TDC) position in readiness to start the expansion event, as a downstroke, in the middle cylinder 2. Exhaust valve 35 is shown in closed position, the closing having occurred 20° BTC for purposes later explained.

Secondary air, suitably compressed and delivered by an appropriate conventional system (not shown), is injected at recommended inlets 40, 41 into combustion chamber 38 by way of conduits 26 and said open ports 25. The duration of the injection period of said air equates with 45° of crankshaft rotation, as a recommended preference.

Said 45-degree period preferably starts 30° BTC and ends 15° ATC, so as: (1) to effect ejection of residual "final exhaust" into manifold 24 from conduits 26 and chamber 38 by the injected said air during the 10-degree period before valve 35 closes; (2) to fill combustion chamber 38 and conduits 26 with a fresh supply of secondary air contained by the three closed valves 31, 32, 35 in the period 20° BTC–15° ATC; and (3) to supply said air to chamber 38 and conduits 26 when movement of piston 10 is either nonexistent or negigible.

Five degrees after the air injection ends, exhaust valve 31 opens 70° BBC to effect sharing of said working medium and secondary air between chambers 37 and 38 via the interconnecting conduit 26.

Unburned combustibles in the hot medium are rapidly burned with the aid of said secondary air, whereby the working medium is improved and thus made more powerful as it continues its expansion to drive both pistons downward. Other effects, advantages and benefits deriving from this arrangement of the invention are described subsequently.

Cylinders 1, 2 continue to coact while cylinder 1 exhausts to cylinder 2 until exhaust valve 31 closes and intake valve 27 opens at 10° BTC, enabling cylinder 1 to induct another charge.

The closing of valve 31 ends that period of coaction between cylinders 1, 2 until said valve opens again in the next four-stroke cycle of cylinder 1, leaving the balance of the exhaust work to be done by piston 10 to complete the present cycle.

In the interim, cylinder 3 separately completed its intake and compression events; ignited its fuel/air charge conventionally with the help of spark plug 22; and is seen as though being halfway through its expansion event, except that at that time in such event intake valve 28 is closed.

Exhaust valve 32 then is also closed but is due to open at 70° BBC to commence coaction similarly between cylinders 3, 2 representing the second basic engine unit of this three-cylinder basic section.

The described functions and operation occurring during the overall cycle of the engine will be treated more fully as the explanation proceeds. Comments will also be included on the matter of working-medium back pressure against such valves as 31 and 32 which FIG. 9 illustrates schematically."

Figure 2:
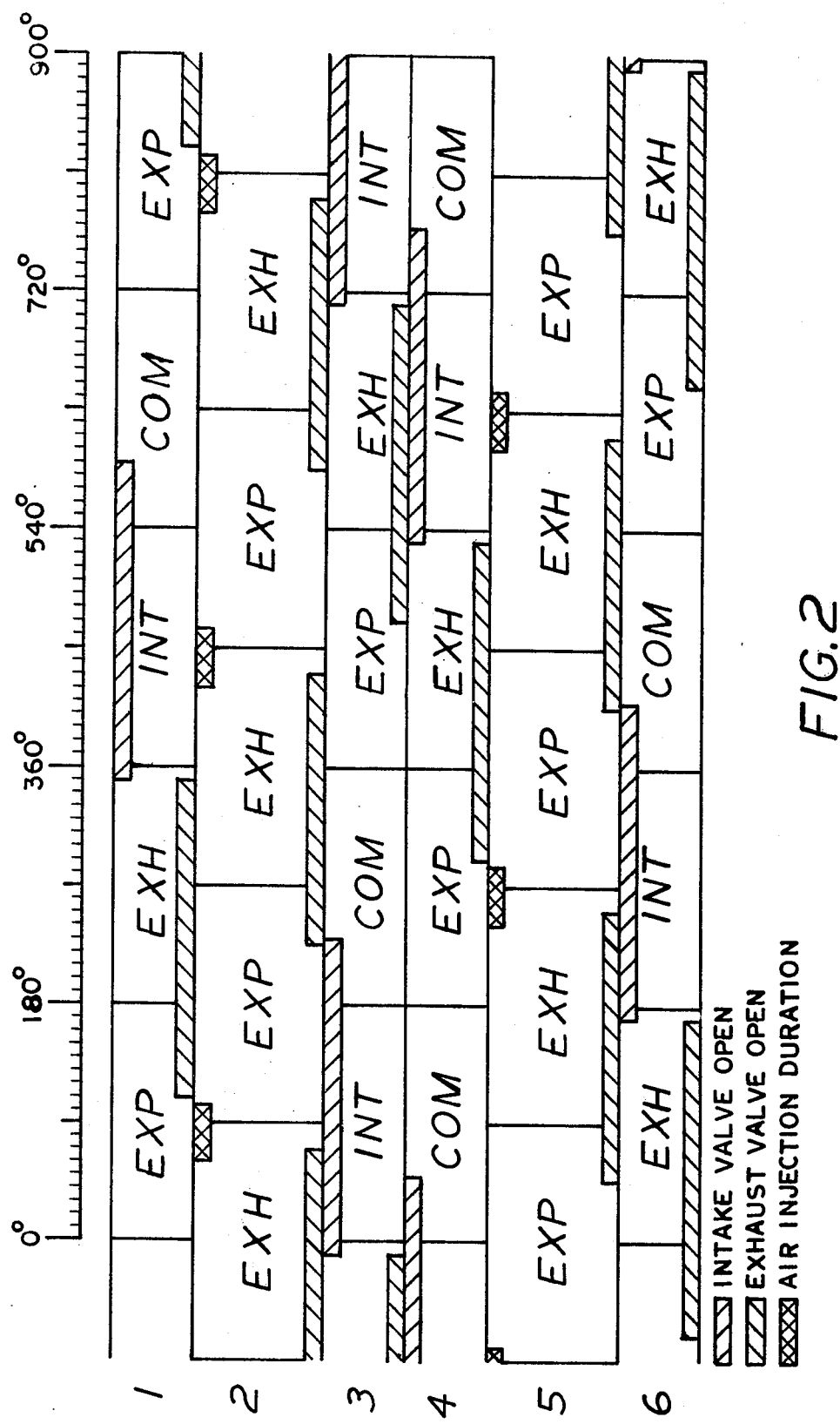
FIG. 2 is a schematic diagram indicating the sequence of the work-cycle events of the engine represented by FIG. 1; secondary air injection periods; and duration of valve open time for each indicated cylinder.

This engine's operation is more readily understood by referring to FIG. 2 as the explanation proceeds.

Since cylinders 1, 2, 3 are compounded to form one said engine section, a detailed explanation of this section will effect better understanding of this engine's over-all operation, especially since the operation of the other section (comprising cylinders 4, 5, 6) is the same.

However, the primary cylinder events of the latter section, by means of crankshaft arrangement, are made to trail the primary cylinder events of the first section by 180° of crankshaft rotation. This is seen on FIG. 2 by noting the course of the primary events, such as the expansion events for example.

Cylinder 1 fires first, initiating that expansion event at 0° on the shown scale. At 180° on the scale, cylinder 4 in the other section fires its expansion event. Cylinder 3 does the same in the first section at 360°, followed by cylinder 6 in the other section at 540°. At 720° these primary cylinders repeat that same course.

In this engine and others described herein, each engine section comprises two engine units which function alternately within that section and are distinguished by the particular cylinders then participating to form each unit, even though all cylinders in any one section are interconnected by conduit.

Each time a primary-cylinder exhaust valve opens to effect coaction and the sharing of gases between that cylinder and any other cylinder openly connected thereto by conduit, a working engine unit is separately formed in the engine section containing that primary cylinder.

In said first section, cylinder 1 expansion event starts at 0° on the scale. Cylinder 3 is inducting then its primary air and fuel charge in conventional manner, its intake valve being shown open. Secondary air (supplied by an external system for this engine) is injected into secondary cylinder 2 starting at 30° BTC during the cylinder 2 exhaust event to enable some of this air to treat and expel the residue exhaust through the exhaust port shown open therein, and into an exhaust manifold connected to a common exhaust system. Cylinder 2 exhaust valve closes 20° BTC.

Said injection ends 15° ATC in the expansion event then underway in cylinder 2, thus allowing 5° of crankshaft rotation before cylinder 1 exhaust valve opens at 70° BBC which corresponds with 110° on the FIG. 2 scale.

When cylinder 1 exhaust valve opens, the power-producing working medium in cylinder 1 is shared between cylinders 1 and 2 via the conduit connecting those cylinders. Such sharing enables the working medium to drive both pistons 1 and 2 as they move in the same direction during their power-phase downstroke.

At this point it is worthwhile to observe FIG. 2 closely and visualize, in slow-motion manner, other uncommon effects presumed to occur within this unusual engine.

When cylinder 1 exhaust valve opens, a portion of the hot higher-pressured working medium in cylinder 1 spurts into cylinder 2 and into the lower-pressured secondary air therein, so that gas pressures in both said cylinders may be made equal.

Instantly and practically simultaneously the following occurrences take place: the spurt creates great turbulence in cylinder 2; unburned combustibles in said portion of working medium contact the secondary air, whereby combustion is effected in cylinder 2; this combustion creates a momentary increase of gas pressure in cylinder 2 above that in cylinder 1; that pressure increase and said turbulence tend to force some of the secondary air out of cylinder 2 and into cylinder 1 to equalize the gas pressure; this extends the combustion process in cylinder 1 wherein combustion of unburned combustibles is supported by said secondary air.

On the scale of FIG. 2, the midpoint of cylinder 1 expansion event is seen at 90°. At that point the crankshaft crank serving cylinder 1 (crank 1) is at its most effective leverage angle and piston 1 has reached its maximum speed.

During the period between 90° and 180° on the scale, the effective leverage angle of crank 1 decreases, and reaches zero effectiveness at bottom dead center (BDC) thereby ending the cylinder 1 expansion event (at 180° on scale). However, in this same period, crank 2 leverage increases, so that its most effective angle is reached at said 180° mark. Therefore, the crank 2 leverage gain tends to offset or balance out the crank 1 leverage loss.

This coaction brings forth a considerable improvement in engine torque derived during said period from the burning of only a single fuel/air charge.

During the period between 90° and 135° per said scale on FIG. 2, the speed of piston 1 is greater than that of piston 2. This produces the effect of drawing more secondary air from cylinder 2 into cylinder 1, combustion therein improving accordingly.

Piston speed becomes equal in both cylinders when crank 1 reaches 45° BBC with crank 2 then at 45° ATC. After that point the speed of piston 2 exceeds that of piston 1, thereby enabling the working medium to enter cylinder 2 rapidly and become exposed more to residual secondary air in cylinder 2 to again further the combustion process.

At 180° on scale, cylinder 3 starts its compression event to compress the fuel/air charge therein; and cylinder 1 starts its exhaust event during which piston 1 undergoes an upstroke.

At 225° on the scale, an important period of 90° of shaft rotation ends. During that special period (135° to 225°), cylinder 2 is found to produce more power output than cylinder 1, due to the leverage advantage held then by crank 2 over that of crank 1 together with the greater speed and continued downstroke of piston 2. The greater downward speed of piston 2 decreasingly offsets even the upward direction of piston 1 during the period between 180° up to 225° on the scale, at which point such offsetting advantage ceases.

At the 225° mark, the upward speed of piston 1 equals the downward speed of piston 2, which results from crank 1 being at an angle of 45° ABC and crank 2 at the angle of 45° BBC. Therefore, the crank 2 position requires that cylinder 2 exhaust valve be opened at 45° BBC to start then the expulsion of the gases. Any later opening of this valve would result in a power-absorbing buildup of gas pressure in both cylinders as piston 1 moves upward with increasing speed.

At 230° on scale, cylinder 3 intake valve closes as crank 3 reaches 50° ABC. At 270° on scale, cylinder 2 exhaust event starts, at which point piston 1 has reached its maximum speed while it ejects cylinder 1 gases (spent medium) into cylinder 2 and through the open exhaust port thereof.

Both cylinders 1 and 2 exhaust through the cylinder 2 exhaust port between 270° and 350° per the scale. At the 350° mark, cylinder 1 exhaust valve closes 10° BTC and intake valve opens 10° BTC to allow induction of a new fuel/air charge into cylinder 1.

Cylinder 3 expansion event starts at 360° on scale to effect the same action between cylinders 3 and 2 as occurred between cylinders 1 and 2 since the 0° scale mark.

After 350°, cylinder 1 no longer coacts with cylinder 2 during the balance of the four-event cycle of cylinder 1. Thus, cylinder 2 continues singly to exhaust until its exhaust valve closes 20° BTC (430° on scale), that exhaust event ending at 450° on scale. As before, secondary air is injected again during the period 30° BTC and 15° ATC into cylinder 2 to prepare same for its similar coaction with cylinder 3.

It is indicated on FIG. 2 that the expansion events of primary cylinders 1 and 3 occur alternately in that engine section at 360-degree intervals. Thus, those events are sequentially separated by a shown period of 180° during which said cylinders do not produce useful power.

This condition is improved by the primary cylinders 4 and 6 in the other engine section. The expansion events of these cylinders occur between the same events of cylinders 1 and 3, the overall effect being that primary expansion events occur at 180-degree intervals, as shown.

On FIG. 2, it is seen also that the primary and secondary expansion events occur alternately, thus providing an expansion event every 90-degree period of crankshaft rotation. This simulates somewhat the effects of an eight-cylinder engine, as to smoothness of operation. Since only four cylinders induct fuel/air charges, this six-cylinder engine is expected to operate economically and efficiently.

According to this invention, each primary cylinder exhaust valve groverns the period during which actual coaction occurs between compounded cylinders forming a particular engine unit, the duration of the valve's open time being the measure of said period.

In this engine, therefore, cylinders 1 and 2 coact between 110° and 350° per said scale; cylinders 3 and 2 coact between 470° and 710° cylinders 4 and 5 coact between 290° and 530°; and so forth. Each such period in this engine amounts to 240° of crankshaft rotation.

The effects and advantages resulting from such coaction, however, extend beyond the said period of 240°. For example, cylinder 2 expansion event actually extends the cylinder 1 expansion event by 90° of shaft rotation, representing a 50% increase in the time the working medium can perform useful work.

Since the exhaust-to-atmosphere action is delayed accordingly by the extension of the said expansion event, more time is provide thereby for combustion within the engine.

The benefits derived from the introduction of secondary air at such unusual time and in such novel manner were mentioned hereinbefore. Also already defined were the advantages effected by the sharing of the working medium between compounded cylinders; the opportunity given said medium to expand further in two compounded cylinders (in this engine) whereby said medium moves both pistons; and the use of both cranks as a combination to offset crank-leverage loss and to increase the engine's torque output, all such benefits being attained in conjunction with the burning of each single fuel/air charge whereby fuel is conserved.

From the foregoing explanation, the ignition firing order in primary cylinders appears as 1–4–3–6. The combustion-expansion order for all cylinders is 1–2–4–5–3–2–6–5, simulating the power pulses of a conventional eight-cylinder engine.

As picturized on FIG. 2, primary-cylinder exhaust valves open at 70° BBC and close 10° BTC. The intake valves of those cylinders are shown to open at 10° BTC and close 50° ABC. Secondary-cylinder exhaust valves open 45° BBC and close 20° BTC.

The compound engine is expected to operate better without the conventional intake-exhaust valve overlap in primary cylinders, particularly because of the exhaust gas pressure being shared between primary and secondary cylinders.

The injection of secondary air for this engine is to be made available via an external system (not shown) which can be of any of numerous conventional means and which must be capable of supplying a sufficient quantity of suitably-compressed air, such as may be contained in an air tank for release to the concerned part of the secondary cylinder system in accordance with the aforementioned timing.

I deem it best to have the secondary air injected simultaneously at two locations with regard to each secondary cylinder's operation. There should be preferably one air port, valve or nozzle (whichever of these is used depends on the type of "external system" selected by the user), located at the primary-cylinder end of each aforesaid in-cylinder-head conduit so as to have injected air directed at the exhaust side of the exhaust valve of both inter-connected primary cylinders.

In operation, as the piston of each secondary approaches the end of its exhaust stroke, the air injected at the exhaust valves of the two adjacent primary cylinders will first serve to expel the residual exhaust gases from both conduits and that secondary cylinder; and then, when the secondary cylinder exhaust valve closes, the additional air injected will support the burning of any still-combustible gases about to come from one of the connected primary cylinders.

FIG. 3a shows crankshaft crank positions for this six-cylinder engine. Cranks for primary cylinders 1 and 3 are shown at top center position. At bottom center are the cranks for primary cylinders 4 and 6. From the arrow's indication of clockwise rotation of the crankshaft, the crank for secondary cylinder 5 lines up at 90° ATC. The other crank for secondary cylinder 2 is set at 270 degrees ATC. This crank arrangement should satisfy the engine's static-balance requirements.

Improvement of engine performance as a result of compounding will be effected with all six cylinders having the same bore. However, for additional engine torque and performance improvement, the bore of each secondary cylinder in this engine may be increased to provide secondary pistons with a greater piston-head area.

As per FIG. 1, I recommend the use of two single-throat carburetors 13, so that each of the two engine sections will be served by one carburetor through the shown short, direct and even-length intake manifold ducts. Heat for improving vaporization of fuel can be taken from the exhaust manifold which is shown as running underneath each of the carburetors.

The V-8 compound engine comprises two banks of cylinders separated by an angle of 90 degrees, each bank consisting of four in-line cylinders. As shown on FIG. 4, cylinders 1, 3, 5 and 7 represent one bank of cylinders, and cylinders 2, 4, 6 and 8 the other.

Referring to FIG. 4, it should be noted that the circles drawn around the cylinder legends 3, 4, 5 and 6 are not fully closed circles. This schematically indicates that there is a constantly-open interconnection between cylinders 3 and 4 by means of conduit connection. Cylinders 5 and 6 are also connected in like manner. These "circles" represent cylinders schematically, and cylinders having constant opening to a conduit, or more than one conduit (when a part of such circle is left open at the conduit juncture); and cylinders containing one or more valves, which, in their operation, are shown to be in CLOSED position by the part of the circle drawn between any cylinder legend number and the conduit or manifold otherwise connected to such cylinder. I find such schematic illustration less confusing, quite simple to effectively clarify the understanding of the description given.

The particular circles drawn around the cylinder legends 3, 4, 5 and 6 on FIG. 4, purposely are not fully-closed circles, because the open portion of the circle equates with constant opening to the conduit; whereas a full circle would indicate presence of a valve (or some means of closing off the concerned conduit, or cylinder interconnection).

The shown short conduit leading from each primary cylinder to its adjacent secondary cylinder is an in-cylinder-head conduit 26 constantly open at the secondary cylinder end, and closed at the other end whenever the primary cylinder exhaust valve is in closed position.

The closed section of the circle between each secondary cylinder legend number and the final-exhaust manifold connection indicates that each secondary cylinder has its own exhaust valve, which is operated by the same camshaft used for the other cylinders in that cylinder bank.

The ignition firing order of primary cylinders is 1–8–2–7, indicating that a fuel/air charge is inducted only by each of these four cylinders.

The crankshaft crank arm positions for this engine are shown on FIG. 3b whereon it is noted that the cranks for cylinders 1 and 6 are at top center; cranks for 5 and 8 are at 90 degrees ATC; cranks for 4 and 7 are at bottom center; and cranks for 2 and 3 are at 270 degrees ATC. As shown, rotation is clockwise.

On FIG. 5, the respective cylinders of this 8-cylinder engine are numbered 1 to 8 at the left of the drawing. Cylinders 1, 2, 3, 4 form one engine section, here designated section 1. Cylinders 5, 6, 7, 8 form another such section, designated section 2 for reference purposes.

In their respective sections, cylinders 1, 2 and cylinders 7, 8 are the primary cylinders. They have ignition means and operate according to the known four-stroke cycle, as indicated.

Secondary cylinders 3 and 4 are not provided with an ignition system, and operate in unison as their shown events indicate. Their two-event work cycle, consisting of expansion and exhaust events, is completed by one revolution of the crankshaft. Neither of these cylinders has an intake valve, but each has an exhaust valve. These valves are used alternately, as seen on FIG. 5.

The specified conduit which connects cylinders 3 and 4 provides constant opening from one to the other, so that gases received and used therein are shared.

The same applies to cylinders 5 and 6 as they function in section 2 as secondary cylinders.

Valve timings are the same as those prescribed for the 6 cylinder engine. The same applies to the duration and timing of the secondary air injections, each secondary cylinder in this engine receiving its separate injection.

As shown on FIG. 5, the engine's operation commences with cylinder 1 in its expansion event, wherein its exhaust valve opens 70° BBC to exhaust part of its working medium to cylinders 3 and 4, so as to share said medium between those three cylinders. Thus, three pistons are acted on by said shared medium to effect improved engine torque.

At that time, the indicated injection of secondary air into cylinders 3 and 4 has been completed and said air is shared between cylinders 1, 3, 4 to support combustion of unburned fuel in said shared working medium.

At 180° on the shown scale, cylinder 1 starts its exhaust event, sending such exhaust as working medium into cylinders 3 and 4. Also at 180°, the expansion event starts in cylinder 8 to begin the same course of events in section 2, involving cylinders 5, 6 and 8.

At 225° on scale, cylinder 4 exhaust valve opens as crank 4 reaches 45° BBC, starting the release of gases from cylinders 1, 3 and 4 to atmosphere.

Secondary air is injected into cylinders 5 and 6 starting 30° BTC, expelling residue exhaust from those cylinders until cylinder 6 exhaust valve closes 20° BTC. Expansion event starts in these cylinders at 270° on scale, and air injected thereto is cut off 15° later.

At 290° on scale, cylinder 8 exhaust valve opens 70° BBC at which point that cylinder's working medium is similarly air treated and shared between cylinders 5, 6 and 8 to effect increased engine torque, prolongation of the combustion process, and extension of the expansion event in section 2 in the same manner as in section 1.

At 350° on scale, cylinder 1 intake valve opens 10° BTC in preparation for that cylinder's next intake of a new charge; and cylinder 1 exhaust valve closes, thus ending the coaction between cylinders 1, 3 and 4 until the next overall cycle involves same.

At 360° primary cylinder 2 starts its expansion event. This commences another round of the same action in section 1 that took place between cylinders 1, 3 and 4; but this time the action is repeated by cylinders 2, 3 and 4.

Lastly, cylinder 7 commences its expansion event to effect another round of action in section 2; this time for cylinders 5, 6 and 7 instead of 5, 6 and 8.

As shown on FIG. 5, alternate primary and secondary expansion events occur at intervals of 90°. This effects an overall combustion-expansion order of $1 - 4^3 - 8 - 5^6 - 2 - 3^4 - 7 - 6^5$ wherein the paired secondary cylinders enter the operation sequence together.

Although this engine utilizes two more cylinders than the described 6-cylinder engine to effect eight power pulses within two complete revolutions of the crankshaft, more space volume is provided in the 8-cylinder engine for expansion of the working medium.

Therefore, in addition to the fact that three pistons are activated in a power-producing downstroke each time two secondary cylinders cooperate with a primary cylinder in sharing the three expansion events of those cylinders, the temperature and pressure of the gases leaving the engine are expected to be considerably lower than the same for conventional 8-cylinder engines. This is expected to represent and indicate an improvement in the thermal efficiency of the engine.

Furthermore, engine torque output developed by the paired secondary cylinders of this engine is expected to be greater than that of the 6-cylinder engine, if all cylinders of the latter have the same bore.

The paired secondary pistons (acting in unison) effects the equivalent of one piston whose head area is doubled for the working medium to push against; and during the period wherein the secondary cranks hold a leverage angle advantage over that of the primary crank, as aforesaid, the paired secondary cranks act as one crank actuated more vigorously by the working medium's pressure applied to said doubled piston-head area.

This V-8 compound engine, using same described crank positions, can be made to induct and distribute internally the secondary air required for improving the combustion-expansion process, without employing the aforementioned external means to supply said air. For such system, the engine would be modified as shown on FIG. 6 and FIG. 7 and as described below.

FIG. 6 shows the same primary cylinders 1, 2, 7 and 8. Only secondary cylinders 3 and 6 coact respectively with a primary cylinder. Cylinders 4 and 5 induct and compress atmospheric secondary air and share same with 3 and 6, respectively, as they coact therewith.

Each cylinder except 3 and 6 has an intake valve. All cylinders have an exhaust valve.

As shown on FIG. 6, the combustion chamber of cylinder 3 is interconnected by conduits to cylinders 1, 2 and 4 and is open to any of those three cylinders only when their respective exhaust valve is open. Cylinder 6 relates to 5, 7 and 8 in the same way.

In any one bank of cylinders, the conduits connecting any pair of adjacent cylinders are in-cylinder-head conduits.

The conduit 26 between 2 and 4 connects those cylinders at the exhaust side of the exhaust valves therein, so as to have said valves control to conduit end ports respectively. This same conduit is also connected to the conduit leading to 3 as aforesaid. Exhaust valve of 1 controls the conduit 25 leading to 3. Cylinder 5 is connected to 6, 7 and 8 in the same manner.

This engine, as well as the others, can be made to operate with one rather than two carburetors. In that case, the intake manifolding would be adjusted accordingly with consideration given to location or position of the said conduits which should be made to confine the heat therein for purposes of safety and effective use of that heat.

To facilitate an understanding of FIG. 7, this engine's operation, and the differences between this engine and that involved with FIG. 5, the compounded engine section 1 will be explained most fully; said section 1 being composed of cylinders 1, 2, 3 and 4 of which cylinders 1 and 2 are the primary cylinders.

The other section 2 comprises cylinders 5, 6, 7, 8 (7 and 8 being primary) and functions exactly like section 1. FIG. 7 shows, however, that the events of section 2 are arranged to effect alternation of like events between the two sections.

On FIG. 7, cylinders 3 and 4 are seen undergoing final exhaust and secondary-air compression events, respectively. As shown, the exhaust valve of 3 is open, whereby said exhaust passes to the exhaust system and hence the atmosphere.

At 0° on the shown scale, cylinder 1 begins its expansion event, while 2 simultaneously undergoes its intake event during which a primary air and fuel charge is inducted through its intake port, shown open.

At 65° BTC (25° on the scale), exhaust valve of 4 opens to connect 4 to the conduit leading 1, 2 and 3. Since the exhaust valves of 1 and 2 are closed, the secondary air from 4 is directed only into 3 and forced thereto by the continuing compression of the air in 4.

A portion of said air treats and expels residue exhaust, during 20° of shaft rotation, from 3 through the exhaust port thereof, said port closing at 45° BTC. Such early closure allows both 3 and 4 to share said air and further compress the same to the end of their respective events at 90° on the scale, whereat the exhaust valve in 4 closes at TDC as the exhaust valve in 1 opens (90° BBC).

At that point, working medium in 1 is shared between 1 and 3 as a compounded engine unit, and secondary air in 3 is also shared between 3 and 1, thus improving combustion and the working medium.

Ten degrees later, intake valve of 4 opens (10° ATC) to allow 4 to induct via separate uninfold 12 per FIG. 6 another supply of secondary air through a connected air filter system (not shown), 4 having been disconnected from the compounded cylinders 1 and 3 since the exhaust valve of 4 closed at said 90° on scale.

At 180° on scale, 2 separately starts its compression event to compress its new fuel-air charge. Simultaneously 1 starts its exhaust event and crank 1 also begins its upstroke to force the gases out of 1 into 3 where the combined gases will perform more work.

Exhaust valve of 3 opens at 45° BBC (225° on scale) to allow flow of exhaust into the exhaust system and also to neutralize the effects of the opposing directions of pistons 1 and 3.

Intake valve in 2 closes 50° ABC (230° on scale) to permit 2 to compress its fuel/air charge. Meanwhile, piston 1 is entering the middle third of its exhaust stroke wherein the speed of piston 1 is faster and the exhaust of 1 is expelled more rapidly through the exhaust ports of 1 and 3.

At 270° on scale, exhaust event of 3 and secondary-air compression event of 4 commence. Ten degrees later (10° ABC), the intake valve of 4 closes, such early closing being advisable so as to prevent a return of the secondary air (through that intake port) during low RPM periods, such as during engine idling and stop-and-go driving in heavy traffic. Thus, engine exhaust quality is improved subsequently by the use of the contained air.

At 350°, intake valve of 1 opens to allow 1 to induct a new charge. At that same time, the exhaust valve of 1 closes (10° BTC), thereby disconnecting 1 from 3 and thus ending their coaction as a unit until the next overall cycle.

Thereafter, 3 completes the exhaust action alone until its open valve allows 4 to shoot, as before, some secondary air into 3 when the exhaust valve of 4 opens 65° BTC (385° on scale).

At 45° BTC, exhaust valve of 3 again closes so 3 and 4 can coact in compressing the remainder of secondary air to the end of their respective events at 450° on scale, whereat the exhaust valve of 4 closes.

The 450° mark indicates the end of the interaction cycle effected by cylinders 1, 3 and 4 during this overall cycle of the engine. The same interaction cycle, now between cylinders 2, 3 and 4, is seen to have begun at 360° on scale, whereat cylinder 2 began its expansion event.

The reading of the full FIG. 7 schematic diagram is now deemed to be accomplished with ease to obtain a clear overall view and grasp of the engine'operation.

The intake of secondary air in such large quantities and the unusual manner by which it is directly exposed to the working medium as it expands during its actual work and power-producing phase, is expected to contribute greatly toward cleansing the exhaust before it leaves the engine and effect a substantial improvement in the engine's use of fuel. Thus, fuel is conserved and the engine produces greater output from a given amount of fuel consumed.

Rich, ignitable fuel-air mixtues explosed in primary cylinders will effect lower high-peak combustion temperatures, whereby less nitrogen oxides are produced. Clean burning of leftover fuel in the engine is assured by the presence of the secondary air copiously supplied by this engine.

Total space provided by this engine for the combustion-expansion process just about doubles that otherwise available in a conventional engine on a fuel/air charge-to-charge basis; and terminal exhaust action is delayed for a period at least equal to 90 degrees of crankshaft rotation, thereby providing about 50% more time for the combustion and use of the fuel inside this engine.

The timing of the opening and closing of all valves is picturized in FIG. 7 to correspond with the following timing specifics. For the primary cylinders 1, 2, 7 and 8, the timing previously mentioned remains unchanged concerning the intake valve, and also the closing time of the exhaust valve therein. But the opening time of the latter valve has been advanced so as to open at 90 degrees BBC, which effects earlier sharing of the working medium between coacting primary and secondary cylinders, and earlier overlap of expansion events thereof.

As cylinders 3, 4, 5 and 6 complete their two-event work cycle in 360 degrees of crankshaft rotation, and because of the said earlier sharing of the working medium, different timing of the concerned valves is recommended as follows.

The exhaust valves of cylinders 4 and 5 open at 65 degrees BTC and close at top dead center (TDC). This provides the 20-degrees period for the said expulsion of spent medium by the compressed secondary air.

The intake valves of cylinders 4 and 5, and the exhaust valves of cylinders 3 and 6, open for a period of 180 degrees of crankshaft rotation; and close for a period of the same interval.

Exhaust valves in 3 and 6 open 45 degrees BBC and close 45 degrees BTC. Intake valves in 4 and 5 open 10 degrees ATC and close 10 degrees ABC.

Concerning all compound reciprocating engines described herein, it is important to use suitable means which will prevent the possible lifting of any exhaust valve from its seat as a result of working medium back pressure against the stem side of said valve head, whenever the working medium is being shared between cylinders during the expansion event of any primary cylinder in the same engine section. The use of said means includes the exhaust valves of cylinders 4 and 5 in the FIG. 6 engine. If not done by stronger valve springs, suitable check valves can be made to prevent said lifting.

FIG. 8 shows one type of means by which said exhaust valves can be kept from being unseated by back pressure generated and released by a primary cylinder undergoing its expansion event as aforesaid. This represents a combination exhaust valve and check valve, for example.

In operation the exhaust valve 14 is opened by the conventional rocker arm or equivalent device in accordance with the cam operating and controlling such mechanism, the force to open such valve being applied at that valve's stem end.

The pressurized gas or working medium in the cylinder chamber 15 flows past the opened exhaust valve 14 into the conduit 16 as it unseats the back-pressure check valve 17, which opens in a direction opposite to that of the exhaust valve. The valve seat 20 is inserted to serve both valves.

The shown check-valve spring 18 is compressed by forces from two directions: the force applied by the spring retainer 19 as it moves toward the valve seat 20; and the force applied by the stem end of the check valve 17 as it moves away from the valve seat 20.

Assuming a stem diameter of 0.371 inch for the exhaust valve 14 and an outside diameter of 1/2 inch for the stem of the check valve 17, the difference between the cross-sectional area of each of said stems approximates 0.088 square inch. Thus, the head area of the check valve 17 at its stem side is 0.088 square inch less than that of the head's other side, as regards exposure of said head to the pressure of the working medium in said conduit 16.

The latter area differential is useful in determining the compression strength required of the check-valve spring, which should seat the check valve at a minimal pressure of two to three pounds.

Assuming for example, a gas pressure 200 PSI in the conduit with the check valve open, the pressure at the head end of that valve would be 17.6 pounds greater than that at the other side of the same valve head (200 × 0.088 = 17.6).

Where the exhaust valve and check valve open, say, a maximum of 3/8 inch each, the check-valve spring will have been compressed 3/4 inch beyond that of its valve-seating compression-length measurement, at which point the spring's pressure or energy should at least equal the aforementioned 17.6 pounds, per said gas pressure.

In any case, the head of the check valve should not be allowed to pound or strike against the valve-guide boss 21 or the end of the valve guide 22 itself. This can be prevented by suitable clearance space and by the use of a check-valve spring having compression strength slightly exceeding that which counterbalances the maximum expected pressure to which said conduit will be exposed.

By the time said exhaust valve closes, the force of the flowing gas ejected from the concerned cylinder will have decreased enough to allow the check valve to close. The seated check valve is then in position to resist back pressure generated by any other cylinder connected by conduit therewith.

The invention is not to be construed as limited to the particular engines and forms disclosed herein, since these are to be regarded as illustrative rather than restrictive, any limitation being to the claimed process and structure and reasonable equivalents.

What I claim is:

1. An internal combustion compound reciprocating engine of the type operating according to the known four-stroke cycle and comprising, in combination:
   (a) primary cylinders and secondary cylinders, each primary cylinder connected to at least one closely-disposed secondary cylinder by means of a conduit compounding said cylinders to form an operable engine unit and serving as a passageway carrying gases transferred and shared between said compounded cylinders during each period in which those cylinders are made to coact by sharing their expansion and exhaust events in a manner effecting a substantial overlap and extension of those events, respectively;
   (b) each primary cylinder being a four-cycle prime mover in which fuel combustion is initiated for creating engine working medium therein;
   (c) means for supplying primary air and fuel only to said primary cylinders and in quantities effecting the equivalent of ignitable fuel-rich mixtures;
   (d) means for timely igniting said mixtures in the primary cylinders, respectively;

(e) means including pistons, connecting rods and a crankshaft arranged for converting the effects of combustion of the fuel into propulsive mechanical force as engine output;

(f) an exhaust valve and port in each primary cylinder serving as means for effecting coaction between compounded whereby means are provided to which gases are transferred, intermixed and shared between those cylinders caused to coact by the conduit-controlling exhaust valve in said primary cylinder via opening said exhaust valve early during the expansion event of that cylinder, and as the secondary cylinder expansion event is occurring, so as to effect an early sharing, overlapping, and compounding of those expansion events via said conduit and a substantial extension of each expansion phase of the engine's operating cycle;

(g) each said conduit connecting a primary-cylinder exhaust port to the combustion chamber of each secondary cylinder in the same engine unit whereat said conduit terminates as a constantly-open port through which gases including working medium may pass in either direction whenever said exhaust port is open, whereby the said gases are shared between the coacting compounded cylinders;

(h) each secondary cylinder adapted to operate according to a two-event work cycle and to receive secondary air and subsequently share same between coacting compounded cylinders as said working medium also is simultaneously shared by those cylinders, said secondary air serving to support the burning of leftover combustibles in said medium whereby the expansive force of said medium is increased to effect improved engine power from a given amount of fuel, combustion is made more complete within the engine, and contaminants in engine exhaust are substantially reduced; and (i) a conventional exhaust system connected to the exhaust ports of said medium-sharing secondary cylinders for transferring therefrom the engine's final exhaust to the atmosphere.

2. An internal combustion compound reciprocating engine of the type operating according to the known four-stroke cycle and comprising, in combination:

(a) primary cylinders and secondary cylinders, each primary cylinder distinguished from secondary cylinders by serving as a four-cycle prime mover initiating a combustion phase of the engine's operating cycle as an expansion event whereas each secondary cylinder operates according to a two-event cycle;

(b) means including a reciprocable piston in each cylinder, a cranksahft, and connecting rods conventionally connecting the respective pistons to said crankshaft for converting the effects of fuel combustion into propulsive mechanical force as engine output;

(c) means for supplying primary air and fuel only to primary cylinders and in quantities effecting ignitable fuel-rich mixtures;

(d) means for timely igniting said mixtures in primary cylinders to effect engine working medium;

(e) means including intake and exhaust valves to effect and control the admission, discharge and transfer of gases to, from and between the cylinders, respectively;

(f) gas transfer conduits, each connecting and thereby compounding one primary cylinder and at least one closely-disposed secondary cylinder whereby means are provided to which gases are transferred, intermixed and shared between those cylinders caused to coact by the conduit-controlling exhaust valve in said primary cylinder via opening said exhaust valve early during the expansion event of that cylinder, and as the secondary-cylinder expansion event is occurring, so as to effect an early sharing, and overlapping, and compounding of those expansion events via said conduit and a substantial extension of each expansion phase of the engine's operating cycle;

(g) a separate manifold connecting intake valve ports of secondary cylinders to a conventional air filter system through which secondary air is inducted during respective intake events of those cylinders, compressed during successive compression events, respectively, and subsequently mixed with said working medium to support burning of combustibles in said medium as it is shared between coacting compounded primary and secondary cylinders during their overlapped expansion events;

(h) means for opening and closing said valves in accordance with timing required by the engine's operating cycle events regulated by said crankshaft;

(i) the crankshaft having cranks disposed such that there is effected equal spacing of the engine's expansion events and alternation of primary and secondary — cylinder expansion events in a manner causing the said overlap of these events occurring in said coacting compounded cylinders; and (j) an exhaust system for transferring the engine's final exhaust from secondary cylinders to the atmosphere.

* * * * *

UNITED STATES PATENT AND TRADEMARK OFFICE
CERTIFICATE OF CORRECTION

PATENT NO. : 4,159,699
DATED : July 3, 1979
INVENTOR(S) : William H. McMrum

It is certified that error appears in the above-identified patent and that said Letters Patent are hereby corrected as shown below:

Column 3, line 15, delete the quotation marks (").

Column 4, line 56, delete the quotation marks (").

Column 7, line 24, "groverns" should read ---governs---.

Column 8, line 20, after "secondary" should read ---cylinder---.

Column 8, line 49, "improviding" should read ---improving---.

Column 11, line 21, "control to" should read ---control the ---.

Column 11, line 54, after "leading" should read ---to---.

Column 12, line 2, "unifold" should read ---manifold---.

Column 12, line 62, "mixtues explosed" should read ---mixtures ---exploded---.

Column 15, line 7, after "compounded" to read ---cylinders---.

Column 16, line 2, "cranksahft" should read ---crankshaft---.

Signed and Sealed this

Twenty-third Day of October 1979

[SEAL]

Attest:

RUTH C. MASON
Attesting Officer

LUTRELLE F. PARKER
Acting Commissioner of Patents and Trademarks